US012719733B2

(12) United States Patent
Zhang et al.

(10) Patent No.: US 12,719,733 B2
(45) Date of Patent: Aug. 25, 2026

(54) DEVICE MANAGEMENT METHOD AND ELECTRONIC DEVICE

(71) Applicant: Lenovo (Beijing) Limited, Beijing (CN)

(72) Inventors: Jihao Zhang, Beijing (CN); Wenwei Tang, Beijing (CN); Ming Lei, Beijing (CN); Jun Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 465 days.

(21) Appl. No.: 18/361,745

(22) Filed: Jul. 28, 2023

(65) Prior Publication Data

US 2024/0036552 A1 Feb. 1, 2024

(30) Foreign Application Priority Data

Jul. 29, 2022 (CN) ........................ 202210905565.9

(51) Int. Cl.
*G06F 3/00* (2006.01)
*G06F 3/0481* (2022.01)
*H04L 41/0253* (2022.01)

(52) U.S. Cl.
CPC ........ *H04L 41/0253* (2013.01); *G06F 3/0481* (2013.01)

(58) Field of Classification Search
CPC ............. H04L 41/0253; G05B 19/4155; G06F 3/0481
See application file for complete search history.

(56) References Cited

U.S. PATENT DOCUMENTS

2009/0323555 A1* 12/2009 Lancaster ........... H04L 41/0253 370/254
2017/0123965 A1* 5/2017 Abdirashid ......... G06F 11/1497
2022/0083183 A1* 3/2022 Patton ................. G06F 9/44505

FOREIGN PATENT DOCUMENTS

CN 110781089 A * 2/2020 .......... G06F 11/3688
CN 111626880 A * 9/2020 ............. G06Q 40/08
CN 112131118 A * 12/2020 .......... G06F 11/3696
CN 113468058 A * 10/2021 .......... G06F 11/3688
CN 114365073 A * 4/2022 ............. G06Q 40/02
CN 114978942 A * 8/2022 ........... H04L 49/208
CN 116931881 A * 10/2023 ............... G06F 8/20
CN 117519861 A * 2/2024 ......... G06F 3/04817
WO WO-2019048905 A1 * 3/2019 ......... G06F 9/44505

* cited by examiner

*Primary Examiner* — Alexander Khong
(74) *Attorney, Agent, or Firm* — ANOVA LAW GROUP, PLLC

(57) ABSTRACT

A device management method includes obtaining a management page for managing a first electronic device, performing a first management operation on the first electronic device based on the management page, obtaining an operation record generated when performing the first management operation on the first electronic device through the management page, and generating an executable command based on the operation record. The executable command is performed by a target device. The target device is configured to instruct one or more second electronic devices to perform the first management operation based on the executable command.

19 Claims, 4 Drawing Sheets

Electronic device

Memory 301

Processor 302

FIG. 6

DEVICE MANAGEMENT METHOD AND ELECTRONIC DEVICE

CROSS-REFERENCE TO RELATED APPLICATION

The present disclosure claims priority to Chinese Patent Application No. 202210905565.9, filed on Jul. 29, 2022, the entire content of which is incorporated herein by reference.

TECHNICAL FIELD

The present disclosure relates to the electronic device technology field and, more particularly, to a device management method and an electronic device.

BACKGROUND

To facilitate server management, server manufacturers or users (i.e., service providers) often provide a management controller for the servers, for example, a baseboard management controller (BMC). Service providers can conveniently perform a management operation such as monitoring, configuration, and updating on a single server through the BMC. However, service providers usually purchase servers from different manufacturers to safeguard the operations of the supply chain. Different server manufacturers employ different management programs for the management controllers. For example, some manufacturers use a universal management tool such as Redfish or Intelligent Platform Management Interface (IPMI). Some server manufacturers develop customized enterprise-level management tools specifically for products of the server manufacturers, such as Lenovo server management tool (Lenovo XClarity Essentials OneCLI).

When the management controllers of the plurality of servers use different types of management programs to realize the same management operation, administrators need to configure management instructions for the management programs, respectively, to develop the corresponding management solutions. Thus, the administrators are required to know the instructions and parameter configuration manners of the various management programs, which causes high training costs and management difficulty of the administrators and low work efficiency. Moreover, when the administrators cannot finish the management task independently, the administrators require the server manufacturers to provide technical support, which increases the cost of the technical support of the server manufacturers.

SUMMARY

Embodiments of the present disclosure provide a device management method. The method includes obtaining a management page for managing a first electronic device, performing a first management operation on the first electronic device based on the management page, obtaining an operation record generated when performing the first management operation on the first electronic device through the management page, and generating an executable command based on the operation record. The executable command is performed by a target device. The target device is configured to instruct one or more second electronic devices to perform the first management operation based on the executable command.

Embodiments of the present disclosure provide an electronic device, including a first acquisition module, a management module, a second acquisition module, and a generation module. The first acquisition module is configured to obtain a management page for managing a first electronic device. The management module is configured to perform a first management operation on the first electronic device based on the management page. The second acquisition module is configured to obtain an operation record generated when performing the first management operation on the first electronic device through the management page. The generation module is configured to generate an executable command based on the operation record. The executable command is executed by a target device. The target device is configured to instruct one or more second electronic devices to perform the first management operation based on the executable command.

Embodiments of the present disclosure provide an electronic apparatus including a memory and a processor. The memory stores a program that, when executed by the processor, causes the processor to obtain a management page for managing a first electronic device, perform a first management operation on the first electronic device based on the management page, obtain an operation record generated when performing the first management operation on the first electronic device through the management page, and generate an executable command based on the operation record. The executable command is performed by a target device. The target device is configured to instruct one or more second electronic devices to perform the first management operation based on the executable command.

BRIEF DESCRIPTION OF THE DRAWINGS

FIG. 6 illustrates a schematic structural diagram of an electronic device according to some embodiments of the present disclosure.

DETAILED DESCRIPTION OF THE EMBODIMENTS

Various solutions and features of the present disclosure are described in connection with the accompanying drawings.

Various modifications can be made to embodiments of the present disclosure. Therefore, the description should not be considered as limiting, but only as an example of embodiments of the present disclosure. Those skilled in the art can think of other modifications within the scope and spirit of the present disclosure.

The drawings included in the specification and forming a part of the specification illustrate embodiments of the present disclosure and are used together with the general description and the detailed description provided below to explain the principles of the present disclosure.

Through the description of some exemplary embodiments according to the accompanying drawings, features of the present disclosure will become apparent.

Furthermore, although the present disclosure is described according to some embodiments of the present disclosure, those skilled in the art can determine many other equivalent forms of the present disclosure, which have the features of the appended claims and are within the scope of the appended claims.

In connection with the accompanying drawings and the detailed description provided below, the aspects, features, and advantages of the present disclosure become more apparent.

Then, embodiments of the present application are described in connection with the accompanying drawings. However, embodiments are only examples of the present disclosure and can be implemented in various manners. Well-known and/or repetitive functions and structures are not described in detail to avoid unnecessary or redundant details that may obscure the present disclosure. Therefore, structural and functional details of embodiments of the present disclosure are not intended to limit the claims but are merely provided as a basis and representative examples for teaching those skilled in the art to use various suitable structures of the present disclosure.

The terms "in one embodiment," "in another embodiment," "in yet another embodiment," or "in other embodiments" used throughout the specification can refer to one or more of the same or different embodiments of the present disclosure.

Figure 1:
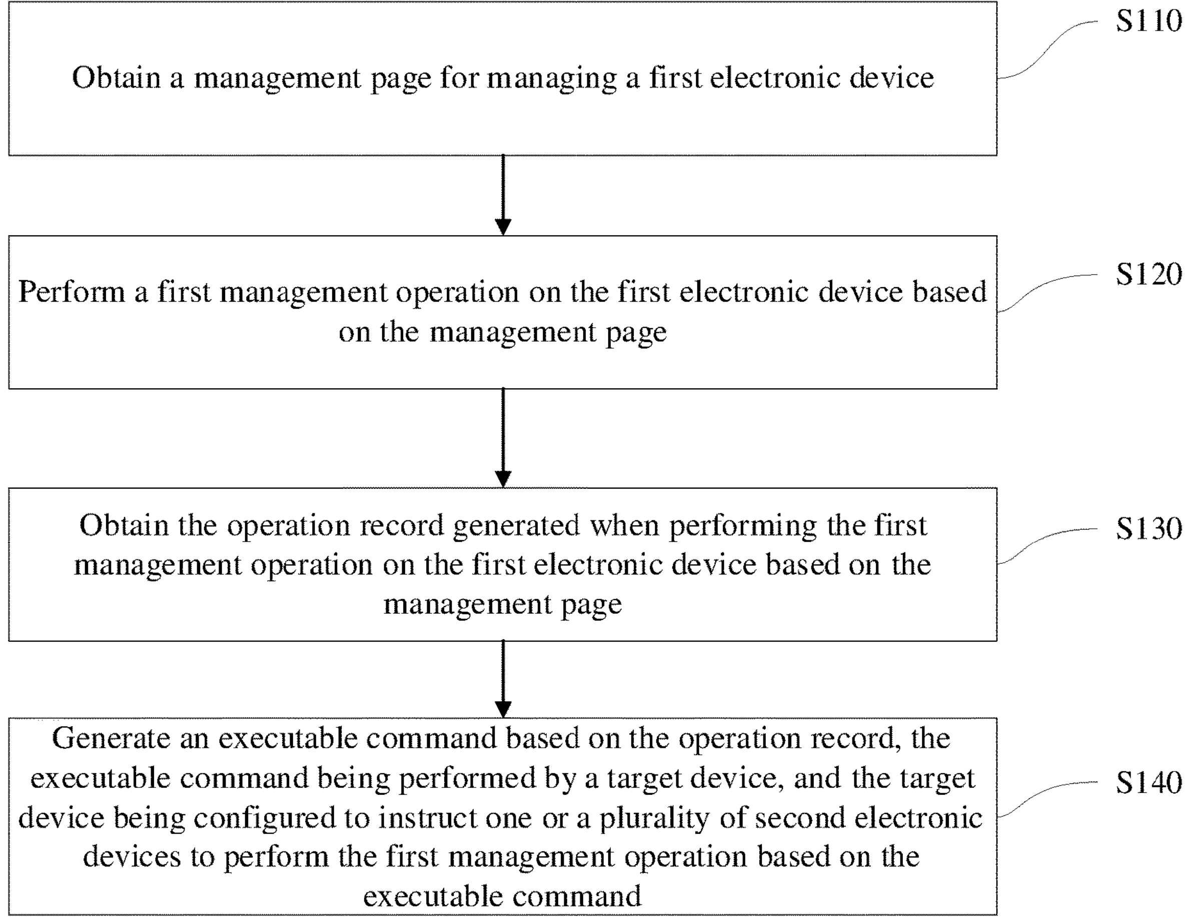
FIG. 1 illustrates a schematic flowchart of a device management method according to some embodiments of the present disclosure.

Embodiments of the present disclosure provide a device management method to perform batch management on a server, a router, a switch, a firewall, and a computer room power system. FIG. 1 illustrates a schematic flowchart of a device management method according to some embodiments of the present disclosure. As shown in FIG. 1, the device management method of embodiments of the present disclosure includes the following processes.

At S110, a management page for managing a first electronic device is obtained.

In some embodiments, the first electronic device can include but is not limited to a server, a router, a switch, a firewall, and a computer room power system. For example, the first electronic device can be a server. Then, the first electronic device can be various types of servers, such as a file server, a database server, a mail server, and a file transfer protocol (FTP) server. The management page can be a page used for managing the first electronic device, which matches an operating system of the first electronic device. For example, the management page can be a management page of a baseboard management controller (BMC) for managing the server.

In some embodiments, the management page can be obtained in various manners. For example, the management page can be obtained through a browser based on a uniform resource locator (URL) of the management page. In some other embodiments, the management page can be obtained by activating the management program.

At S120, a first management operation is performed on the first electronic device based on the management page.

In some embodiments, the first management operation can include but is not limited to obtaining a device list, task management, remote control, firmware update, server configuration, etc. Obtaining the device list can include, but is not limited to, obtaining a central processing unit (CPU) list, a memory (DIMM) list, a disk (DISK) list, a power supply unit (PSU) list, a fan list, etc. The server configuration can include but is not limited to adapter configuration, boot configuration, power control, etc. The above management operations are only examples of the first management operation and are not exhaustive. The first management operation can include various management operations for the first electronic device.

In some embodiments, the management page can include a plurality of operation objects. The operation objects can be used to realize the corresponding first management operations, respectively. For example, a first-level page of the management page can include a menu bar. The menu bar can include an option such as device list, task management, remote control, firmware update, and server configuration. After selecting a corresponding option, the management page can further display a second-level page, a third-level page, etc. The second-level page and third-level page can include a configuration option or a dialog box for entering configuration information for a specific first management operation.

Figure 2:
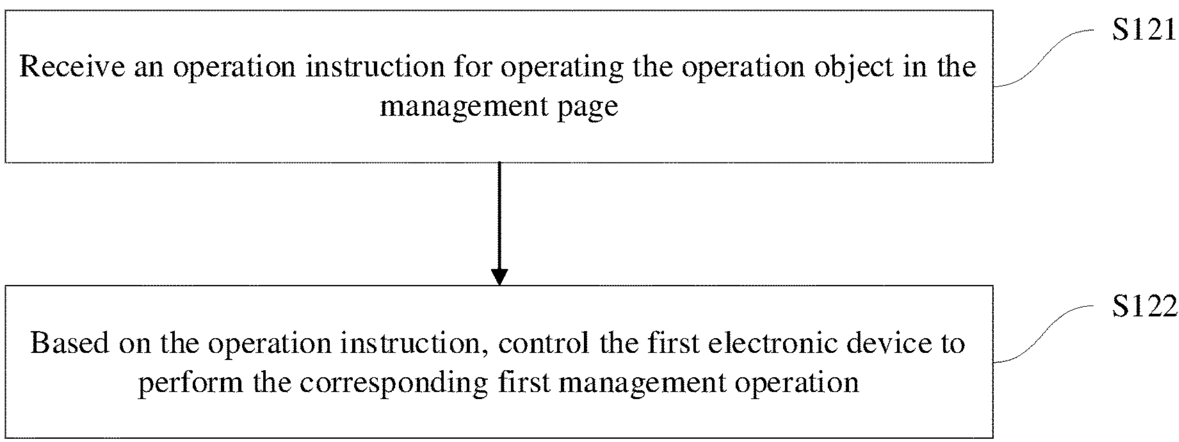
FIG. 2 illustrates a schematic flowchart of process S120 of the device management method according to some embodiments of the present disclosure.

Based on this, cooperating with FIG. 2, in S120, performing the first management operation on the first electronic device based on the management page includes the following processes.

At S121, an operation instruction for operating the operation object is obtained on the management page.

In some embodiments, the operation instruction can be an operation instruction sent by an administrator to the electronic device through an input device. For example, the operation instruction can include an instruction sent by the administrator to the electronic device using a mouse, keyboard, touchpad, voice recognition device, etc. The operation instruction can indicate a selection of the operation object or an input of content to the operation object. For example, the operation instruction can be used to indicate to select a certain option in the menu bar or to indicate to input an instruction or information in a certain dialog box on the second-level page or the third-level page.

At S122, based on the operation instruction, the first electronic device is controlled to perform the corresponding first management operation.

In some embodiments, when the operation instruction is obtained, the first electronic device can be controlled to perform the first management operation corresponding to the operation object indicated by the operation instruction. For example, if the operation instruction is used to select the option of the device list in the menu bar, the operation of obtaining the device list of the first electronic device can be performed. For another example, if the operation instruction not only indicates the selection of the option of the boot configuration in the menu bar but also indicates to input the configuration information into the boot configuration interface, the boot configuration can be performed on the first electronic device based on the option of the boot configuration and the configuration information.

Performing the first management operation on the first electronic device based on the management page can include sending the management instruction to the first electronic device based on the management page. Indicating that the first electronic device has performed the first management operation can also include generating an operation record by simulating the first management operation on the first electronic device based on the management page. For example, only the selection and configuration of the operation option can be performed without triggering the action of sending the management instruction.

At S130, the operation record generated when performing the first management operation on the first electronic device based on the management page is obtained.

In some embodiments, when the management page includes a plurality of operation objects, obtaining the operation record can include determining the operation object pointed by the operation instruction and the operation content performed on the operation object. For example, determining which option in the menu bar the operation instruction point to and determining the specific operation content performed on the corresponding option. The operation content can include but is not limited to content selection and input.

In some embodiments, the management page can also include a dialog box for inputting the operation instruction. The administrator can input the operation instruction into the dialog box to perform the first management operation on the first electronic device Based on this, obtaining the operation record can include obtaining the operation instruction input in the dialog box.

In some embodiments, obtaining the operation record can include selectively obtaining the required operation record according to the user needs. That is, the administrator can perform a plurality of first management operations on the first electronic device based on the management page and obtain some operation records of the plurality of first management operations as needed, rather than obtain an operation record for each first management operation. For example, the management page can include an intelligent management option, and after the user completes a certain first management operation, the user can select the corresponding intelligent management option to obtain the operation record for that first management operation.

For another example, the management page can also include a start recording option and an end recording option. After selecting the start recording option, the administrator can perform one or the plurality of first management operations on the first electronic device based on the management page and continuously obtain the operation records for the one or the plurality of first management operations. After the administrator selects the end recording option, the ending operation record can be obtained.

At S140, an executable command is generated based on the operation record. The executable command is performed by a target device. The target device is configured to instruct one or a plurality of second electronic devices to perform the first management operation based on the executable command.

In some embodiments, a command set can be pre-built. The command set can include the executable command or a command template used to generate the executable command. The operation object in the management page can have a mapping relationship with the command template in the command set. When the operation record is obtained, the executable command can be obtained from the command set based on the operation record, or the command template can be obtained, and the executable command can be generated based on the command template.

In some embodiments, the executable command can be configured to be recognized and executed by the target device, and the target device can execute the executable command to send the management instruction to the one or the plurality of second electronic devices. The one or the plurality of second electronic devices can execute the first management operation based on the management instruction. For example, the executable command can be executed by the target device and can cause the target device to send the management instruction matching the management program of the second electronic device to the one or the plurality of second electronic devices. Moreover, the management program of the second electronic device can be used to control the second electronic device to execute the first management operation based on the management instruction.

In some embodiments, the target device can be an electronic device configured to perform batch management on the one or the plurality of second electronic devices. The target device can include various electronic devices capable of being communicatively connected to the one or the plurality of second electronic devices, for example, a desktop computer, a laptop, a tablet, a smart car, or another baseboard management controller. In some embodiments, the target device can be configured to send the management instruction to the one or the plurality of second electronic devices based on an out-of-band management system or an in-band management system.

In some embodiments, the executable command can be executed at an operating system level of the target device. For example, the target device can have a Linux or Windows operating system. The executable command can be a command compliant with the Uniform Resource Locator (URL) protocol, and the target device can execute the executable command using a browser. The target device is not limited to executing the executable command through the browser but can also execute the executable command through a disk operating system (DOS) or a specific application program.

In some embodiments, the second electronic device can include but is not limited to a server, a router, a switch, a firewall, and a data center power system. For example, the second electronic device can be a server. Thus, the second electronic device can be a file server, a database server, a mail server, a File Transfer Protocol (FTP) server, or another type of server. For example, the second electronic device can include a server and a management controller for managing the server. Thus, the management instruction can match the management program of the management controller. The target device can be configured to send the management instruction to the management controller based on the executable command and instruct the management controller to perform the first management operation on the server. The management controller can include but is not limited to a Baseboard Management Controller (BMC). The management program of the management controller can be a general management tool such as a RedFish management tool or an Intelligent Platform Management Interface (IPMI) management tool. Server manufacturers can also customize enterprise-level management tools for their products, such as the Lenovo server management tool (Lenovo XClarity Essentials OneCLI).

In some embodiments, the first management instruction can be sent to the first electronic device based on the management page to instruct the first electronic device to execute the first management operation. The executable command can be configured to be executable by the target device, and the target device can send the second management instruction to the one or the plurality of second electronic devices based on the executable command to instruct the second electronic device to perform the first management operation. The first management instruction can match the first management tool used by the first electronic device, and the second management instruction can match the second management tool used by the second electronic device. The second management tool can be different from the first management tool. For example, the first management instruction can be applicable to the One-CLI management tool, while the second management instruction can be applicable to the RedFish management tool. Thus, when the management tool used by the second electronic device is different from the management tool used by the first electronic device, the batch management can be realized on the second electronic device.

In some embodiments, a plurality of different executable instructions can be obtained. The plurality of different executable instructions can be configured to be executable by the target device. The target device can then send the management instruction matching the corresponding management program to the plurality of second electronic devices based on the plurality of different executable instructions to instruct the plurality of second electronic devices to perform the same first management operation.

A device management method of embodiments of the present disclosure can include obtaining the management page used to manage the first electronic device, performing the first management operation on the first electronic device based on the management page, obtaining the operation record generated when performing the first management operation on the first electronic device through the management page, and generating the executable instruction based on the operation record. The executable instruction can be performed by the target device, and the target device can be configured to instruct the one or the plurality of second electronic devices to perform the management operation based on the executable instruction. Thus, the executable instruction can be generated by the target electronic device using the management page of the first electronic device. The target device can be configured to perform the batch management on the one or the plurality of second electronic devices based on the executable instruction to lower the management load and management cost of the administrator and increase the management efficiency.

In some embodiments, the method can further include the following processes.

At S150, an executable script including the plurality of executable commands is generated based on the plurality of executable commands. The executable script is executed by the target device, and the target device can instruct the one or the plurality of second electronic devices to sequentially perform the plurality of first management operations based on the executable script.

In some embodiments, the method can include performing the plurality of first management operations performed on the first electronic device based on the management page, for example, performing task management on the first electronic device, performing startup configuration on the first electronic device, performing firmware updates on the first electronic device, etc. Based on this, the plurality of executable commands can be generated based on the operation record. The target device can perform the plurality of executable commands to instruct the second electronic device to perform the plurality of first management operations, such as perform the task management, the startup configuration, and the firmware update. The executable script including the plurality of executable commands can be generated based on the plurality of executable commands to cause the target device to automatically perform the plurality of executable commands in sequence. Thus, the administrator does not need to enter the executable commands one by one, and the management operation can be further simplified to improve management efficiency.

Figure 3:
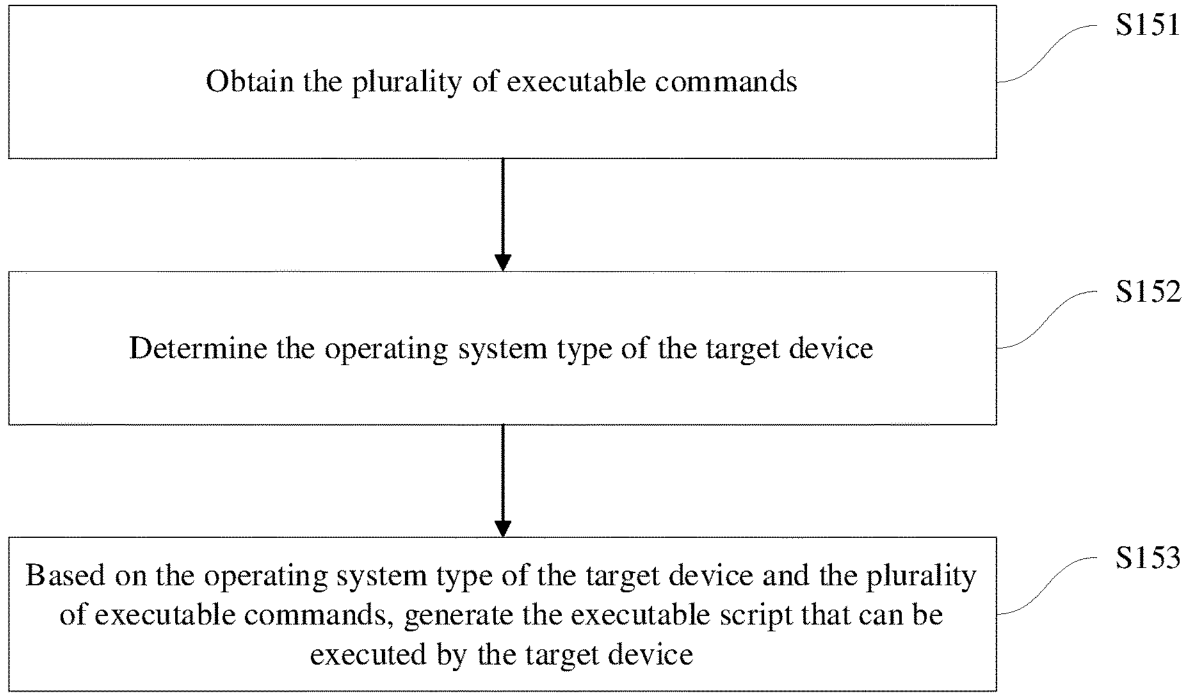
FIG. 3 illustrates a schematic flowchart of process S150 of the device management method according to some embodiments of the present disclosure.

In some embodiments, as shown in FIG. 3, process S150 of generating the executable script including the plurality of executable commands based on the plurality of executable commands includes the following processes.

At S151, the plurality of executable commands are obtained.

At S152, the operating system type of the target device is determined.

At S153, based on the operating system type of the target device and the plurality of executable commands, the executable script that can be executed by the target device is generated.

In some embodiments, a plurality of manners can be used to determine the operating system type of the target device. Since the operating system type is limited and includes Windows, Linux, Unix, and Mac, which are commonly used, an operating system type option can be configured on the management page for the administrator to select. In some other embodiments, a dialog box can be configured on the management page for the administrator to enter the operating system type. In addition, when the electronic device adopting the device management method is communicatively connected to the target device, the electronic device can also send a query request to the target device to require the target device to feedback on the operating system type.

When the operating system type of the target device is determined, the executable script matching the operating system type of the target device can be generated based on the operating system type of the target device and the plurality of executable commands. For example, When the target device adopts the Windows operating system or DOS operating system, a batch script can be generated. When the target device adopts the Linux operating system, a Bash script can be generated, which can be executed through the Shell program in the Linux operating system.

Figure 4:
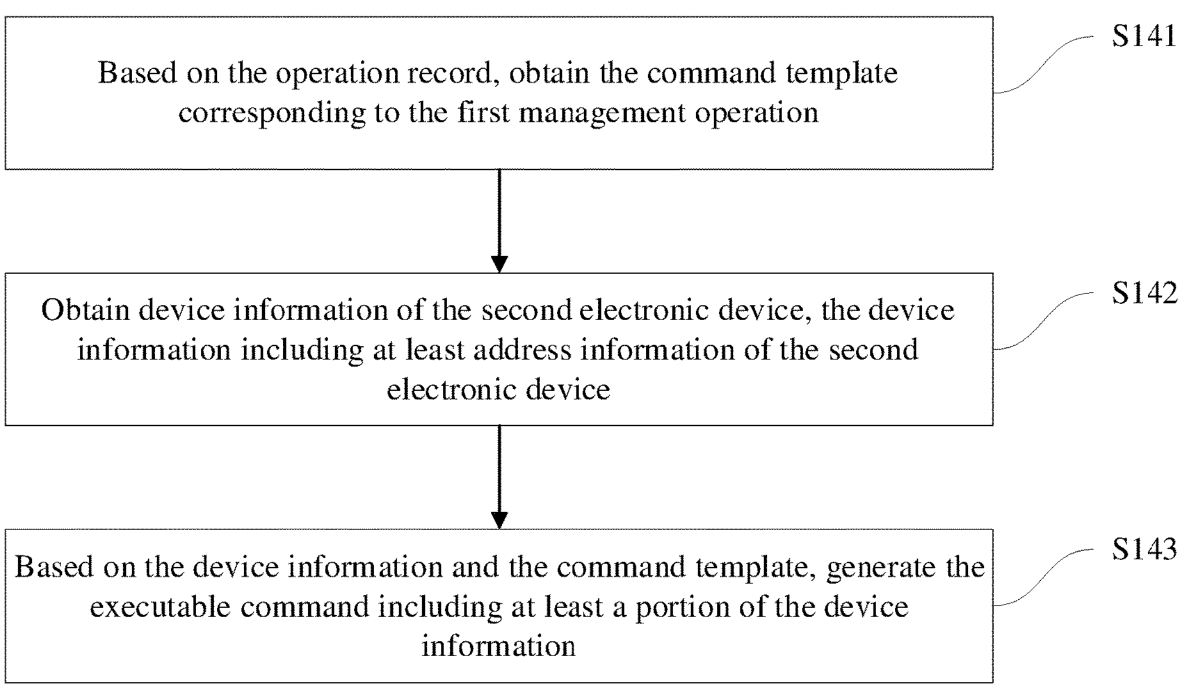
FIG. 4 illustrates a schematic flowchart of process S140 of the device management method according to some embodiments of the present disclosure.

In some embodiments, as shown in FIG. 4, process S140 of generating the executable command based on the operation record includes the following processes.

At S141, based on the operation record, the command template corresponding to the first management operation is obtained.

At S142, device information of the second electronic device is obtained. The device information includes at least address information of the second electronic device.

At S143, based on the device information and the command template, the executable command including at least a portion of the device information is generated.

In some embodiments, the command set can be built in advance for different management tools. For example, corresponding command sets can be built for the RedFish management tool, the IPMI management tool, the OneCLI management tool, and the another management tool, respectively. The operation objects on the management page can have a multiple-level mapping relationship with the command templates in the command set. When the operation record is obtained, the operation object on the management page to which the operation instruction points can be determined during the process of performing the first management operation on the first electronic device based on the operation record and obtaining the command template based on the mapping relationship between the operation object and the command template in the command set for the operation content executed by the operation object.

In some embodiments, the device information of the second electronic device can include at least the address information of the second electronic device. The address information can include an IP address and a port number of the second electronic device. The device information of the second electronic device can also include the account name and password of the second electronic device. The account name and password can be the account name and password of the management program of the management controller. The management page can have a dialog box for inputting the device information of the second electronic device.

Taking the command template of the boot configuration for the RedFish management tool as an example, the command template can include/curl -data-raw "{"BootModes_SystemBootMode":"UEFI Mode or Legacy Mode"} . . . PATCH https://IP address and port number/redfish/v1/Systems/1/Bios/Pending." The boot configuration option on the management page can have a mapping relationship with the command template in the command set. When the boot configuration option is selected, the command template can be selected. Then, a second-level page can be popped up on the management page. The second level page can further provide two options "UEFI boot" and "Legacy boot," which have mapping relationships with command segments of "UEFI Mode" and "Legacy Mode." If the "UEFI boot" option is selected, the command segment of "UEFI Mode" can be determined to be selected in the command template. Taking the IP address and the port number of the second electronic device of 10.240.199.88:6443 as an example, the IP address and the port number can be added to the corresponding location in the command template to form the executable command, which is /curl -data-raw "{"BootModes_SystemBootMode":"UEFI Mode"} . . . PATCH https://10.240.199.88:6443/redfish/v1/Systems/1/Bios/Pending." When the target device executes the executable command, the second electronic device can be instructed to perform the boot configuration based on the address information to set the second electronic device to boot using UEFI.

In some embodiments, process S141 of obtaining the command template corresponding to the first management operation based on the operation record can include, based on the operation record, obtaining the plurality of command templates that are applicable to different types of devices, determining the device type of the second electronic device, and selecting the target command template matching the device type of the second electronic device from the plurality of the command templates.

In some embodiments, the command templates for different device types can mainly include the command templates applicable to the different types of second electronic devices, for example, servers applicable to different types of management controllers. The different types of management controllers can adopt different types of management programs. For example, the management controllers can adopt the RedFish management tool or the OneCLI management tool as the management program. Correspondingly, the device type of the second electronic device can include the type of management program used by the management controller of the second electronic device.

In some embodiments, the operation objects on the management page can have a multi-level mapping relationship with the command templates in the command set. When the operation record of the management page is obtained, the command templates that are applicable to the different types of devices, respectively, can be obtained from the command set based on the operation record and the mapping relationship. The dialog box for the device type of the second electronic device or an option of the device type for the administrator to select can be further arranged on the management page. Then, the target command template matching the device type of the second electronic device can be selected from the plurality of command templates based on the device type of the second electronic device, for example, the target command template applicable to the RedFish management tool or the OneCLI management tool.

For example, the main page of the management page can have a menu bar. The menu bar can include a plurality of options such as firmware update, server configuration, BMC configuration, etc. When the administrator selects an option such as firmware update, the management page can display the second-level page for the firmware update. The information such as the firmware version can be configured based on the second-level page. Then, the administrator can select to update the firmware to perform the firmware update operation on the first electronic device. In some other embodiments, the administrator can select to save as a command. The management page can display a third-level page. The third level page can display command templates applicable to different types of management tools such as a command template applicable to the RedFish management tool and a command template applicable to the OneCLI management tool. Meanwhile, the third level page can also include the options corresponding to the management tools such as the RedFish management tool and the OneCLI management tool. The user can select a corresponding option to determine the device type of the second electronic device and select a corresponding command template.

Figure 5:
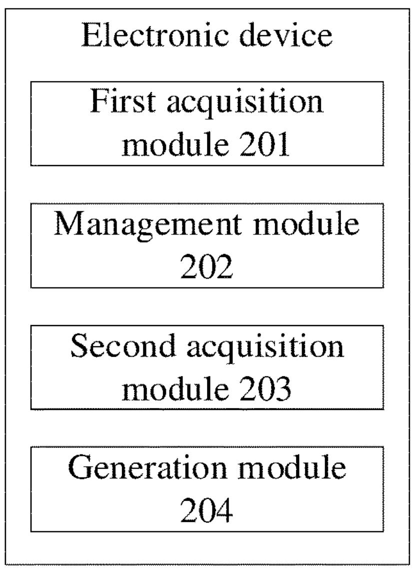
FIG. 5 illustrates a schematic structural diagram of an electronic device according to some embodiments of the present disclosure.

As shown in FIG. 5, embodiments of the present disclosure also provide an electronic device, including a first acquisition module 201, a management module 202, a second acquisition module 203, and a generation module 204.

The first acquisition module 201 can be configured to obtain a management page for managing the first electronic device.

The management module 202 can be configured to perform the first management operation on the first electronic device based on the management page.

The second acquisition module 203 can be configured to obtain the operation record generated when performing the first management operation on the first electronic device through the management page.

The generation module 204 can be configured to generate the executable command based on the operation record. The executable command is executable by the target device. The target device is capable of instructing the one or the plurality of second electronic devices to perform the first management operation based on the executable command.

In some embodiments, the generation module 204 can be further configured to generate an executable script including a plurality of executable commands based on the plurality of executable commands. The executable script is executable by the target device, and the target device is capable of instructing the second electronic device to perform the plurality of first management operations in sequence based on the executable script.

In some embodiments, the generation module 204 can be further configured to obtain the plurality of executable commands, determine the operating system type of the target device, and generate the executable script executable by the target device based on the operating system type of the target device and the plurality of executable commands.

In some embodiments, the management module 202 can be configured to receive the operation instruction for performing the operation on the operation objects on the management page. The management page can include a plurality of operation objects. The plurality of operation objects can be used to realize the corresponding first management operations, respectively. The management module 202 can be further configured to control the first electronic device to perform the corresponding first management operation based on the operation instruction.

In some embodiments, the second acquisition module 203 can be configured to determine the operation object pointed by the operation instruction and the operation content performed for the operation object.

In some embodiments, the generation module 204 can be further configured to obtain a command template corresponding to the first management operation based on the operation record, obtain the device information of the second electronic device, and generate the executable command including at least some of the device information based on the device information and the command template. The device information can at least include the address information of the second electronic device.

In some embodiments, the generation module 204 can be further configured to obtain a plurality of command templates applicable to different types of devices based on the operation record, determine the device type of the second electronic device, and select a target command template matching the device type of the second electronic device from the plurality of command templates.

In some embodiments, the management module 202 can be further configured to send the first management instruction to the first electronic device based on the management page to instruct the first electronic device to perform the first management operation.

Accordingly, the executable command can be executable by the target device. The target device can be configured to send a second management instruction to one or a plurality of second electronic devices based on the executable command to instruct the second electronic device to perform the first management operation.

The first management instruction can match the first management tool adopted by the first electronic device. The second management instruction can match the second management tool adopted by the second electronic device. The second management tool can be different from the first management tool.

Figure 6:
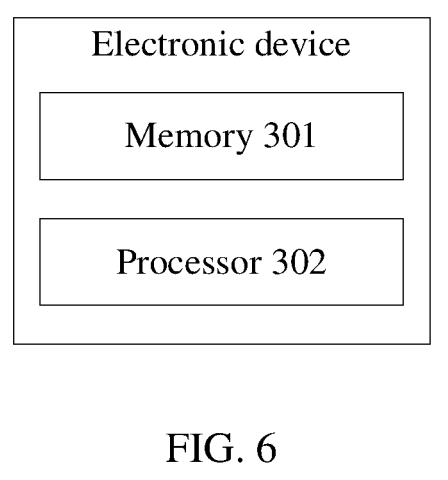

As shown in FIG. 6, embodiments of the present disclosure also provide an electronic device, including at least one or more memories 301 and one or more processors 302. The one or more memories 301 can store a program that, when executed by the one or more processors 302, causes the one or more processor s302 to realize the method of embodiments of the present disclosure.

Those skilled in the art should understand that embodiments of the present disclosure can be implemented as a method, an electronic device, a computer-readable storage medium, or a computer program product. Therefore, the present disclosure can be implemented in the form of fully hardware embodiments, fully software embodiments, or a combination of software and hardware embodiments. Moreover, the present disclosure can adopt the form of the computer program product implemented in one or more computer-readable storage media including the computer-readable program codes. When the present disclosure is implemented by software, the functions can be stored in the computer-readable medium or can be transmitted as one or more instructions or codes in the computer-readable medium.

The one or more processors can include a general-purpose processor, a digital signal processor, an application-specific integrated circuit (ASIC), a programmable logic device (PLD), or any combination thereof. The PLD above can include a complex programmable logic device (CPLD), a field-programmable gate array (FPGA), a generic array logic (GAL), or any combination thereof. The general-purpose processor can be a microprocessor or any conventional processor.

The one or more memories can include non-permanent storage in the computer-readable medium, such as a random-access memory (RAM) and/or non-volatile memory, such as a read-only memory (ROM) or flash RAM. The one or more memories can an example of the computer-readable medium.

The above computer-readable medium can include a disk, a CD, a DVD, a USB, a read-only memory (ROM), a random-access memory (RAM), or any other form of storage medium, which is not limited in the present disclosure.

The above embodiments are merely exemplary embodiments of the present disclosure and are not intended to limit the present disclosure. The scope of the present disclosure is subjected to the claims. Those skilled in the art can make various modifications or equivalent replacements to the present disclosure within the essence and scope of the present disclosure, and such modifications or equivalent replacements should also be within the scope of the present disclosure.

What is claimed is:

1. A device management method comprising:

obtaining a management page for managing a first electronic device;

sending a first management instruction to the first electronic device based on the management page to instruct the first electronic device to perform a first management operation, wherein the first management instruction matches a first management program used by the first electronic device;

obtaining an operation record generated when the first electronic device performs the first management operation through the management page; and generating an executable command based on the operation record, wherein the executable command is executed by a target device, and the target device is configured to instruct one or more second electronic devices to perform the first management operation based on the executable command, wherein the generating the executable command comprises selecting, based on the operation record, a command template from a command set including a plurality of command templates for a plurality of management programs, the command template corresponding to a second management program used by the one or more second electronic devices, and the executing the executable command causes the target device to send a second management instruction matching the second management program to the one or more second electronic devices to instruct the one or more second electronic devices to perform the first management operation, the second management program being different from the first management program.

2. The method according to claim 1, further comprising:

generating an executable script including a plurality of executable commands based on the plurality of executable commands, wherein:

the executable script is executed by the target device; and the target device is configured to instruct the one or more second electronic devices to perform a plurality of first management operations in sequence based on the executable script.

3. The method according to claim 2, wherein generating the executable script including the plurality of executable commands based on the plurality of executable commands includes:

obtaining the plurality of executable commands;

determining an operating system type of the target device; and generating the executable script executable by the target device based on the operating system type of the target device and the plurality of executable commands.

4. The method according to claim 1, further comprising:

receiving an operation instruction for operating an operation object on the management page, the management page including a plurality of operation objects, and the plurality of operation objects being used to realize corresponding first management operations, respectively; and controlling the first electronic device to perform the corresponding first management operations based on the operation instruction.

5. The method according to claim 4, wherein obtaining the operation record generated when performing the first management operation on the first electronic device through the management page includes:

determining the operation object pointed to by the operation instruction and operation content performed on the operation object.

6. The method according to claim 1, wherein generating the executable command based on the operation record includes:

obtaining device information of the one or more second electronic devices, wherein the device information includes at least address information of the one or more second electronic devices; and generating the executable command including at least a portion of the device information based on the device information and the command template.

7. The method according to claim 6, further comprising:

obtaining the plurality of command templates applicable to different types of devices based on the operation record;

determining the device type of the one or more second electronic devices; and selecting a target command template matching the device type of the one or more second electronic devices from the plurality of command templates.

8. The method according to claim 6, wherein the generating the executable command comprises inserting at least a portion of the address information into the command template.

9. An electronic device comprising:

a first acquisition module configured to obtain a management page for managing a first electronic device;

a management module configured to send a first management instruction to the first electronic device based on the management page to instruct the first electronic device to perform a first management operation, wherein the first management instruction matches a first management program used by the first electronic device;

a second acquisition module configured to obtain an operation record generated when the first electronic device performs the first management operation through the management page; and a generation module configured to generate an executable command based on the operation record, wherein the executable command is executed by a target device, and the target device is configured to instruct one or more second electronic devices to perform the first management operation based on the executable command, wherein the generating the executable command comprises selecting, based on the operation record, a command template from a command set including a plurality of command templates for a plurality of management programs, the command template corresponding to a second management program used by the one or more second electronic devices, and the executing the executable command causes the target device to send a second management instruction matching the second management program to the one or more second electronic devices to instruct the one or more second electronic devices to perform the first management operation, the second management program being different from the first management program.

10. The device according to claim 9, wherein the generation module is further configured to:

generate an executable script including a plurality of executable commands based on the plurality of executable commands, wherein:

the executable script is executed by the target device; and the target device is configured to instruct the one or more second electronic devices to perform a plurality of first management operations in sequence based on the executable script.

11. The device according to claim 10, wherein the generation module is further configured to:

obtain the plurality of executable commands;

determine an operating system type of the target device; and generate the executable script executable by the target device based on the operating system type of the target device and the plurality of executable commands.

12. The device according to claim 9, wherein the management module is further configured to:

receive an operation instruction for operating the operation object on the management page, the management page including a plurality of operation objects, and the plurality of operation objects being used to realize corresponding first management operations, respectively; and control the first electronic device to perform the corresponding first management operations based on the operation instruction.

13. An electronic device comprising:

a processor; and a memory storing a program that, when executed by the processor, causes the processor to:

obtain a management page for managing a first electronic device;

send a first management instruction to the first electronic device based on the management page to instruct the first electronic device to perform a first management operation, wherein the first management instruction matches a first management program used by the first electronic device;

obtain an operation record generated when the first electronic device performs the first management operation through the management page; and generate an executable command based on the operation record, wherein the executable command is executed by a target device, and the target device is configured to instruct one or more second electronic devices to perform the first management operation based on the executable command, wherein the generating the executable command comprises selecting, based on the operation record, a command template from a command set including a plurality of command templates for a plurality of management programs, the command template corresponding to a second management program used by the one or more second electronic devices, and the executing the executable command causes the target device to send a second management instruction matching the second management program to the one or more second electronic devices to instruct the one or more second electronic devices to perform the first management operation, the second management program being different from the first management program.

14. The device according to claim 13, wherein the processor is further configured to:

generate an executable script including a plurality of executable commands based on the plurality of executable commands, wherein:

the executable script is executed by the target device; and the target device is configured to instruct the one or more second electronic devices to perform a plurality of first management operations in sequence based on the executable script.

15. The device according to claim 14, wherein the processor is further configured to:

obtain the plurality of executable commands;

determine an operating system type of the target device; and generate the executable script executable by the target device based on the operating system type of the target device and the plurality of executable commands.

16. The device according to claim 13, wherein the processor is further configured to:

receive an operation instruction for operating an operation object on the management page, the management page including a plurality of operation objects, and the plurality of operation objects being used to realize corresponding first management operations, respectively; and control the first electronic device to perform the corresponding first management operations based on the operation instruction.

17. The device according to claim 16, wherein the processor is further configured to:

determine the operation object pointed to by the operation instruction and operation content performed on the operation object.

18. The device according to claim 13, wherein the processor is further configured to:

obtain device information of the one or more second electronic devices, wherein the device information includes at least address information of the one or more second electronic devices; and generate the executable command including at least a portion of the device information based on the device information and the command template.

19. The device according to claim 18, wherein the processor is further configured to:

obtain the plurality of command templates applicable to different types of devices based on the operation record;

determine the device type of the one or more second electronic devices; and select a target command template matching the device type of the one or more second electronic devices from the plurality of command templates.

* * * * *